Jan. 24, 1967     C. G. MILLER     3,300,756
AUTOMATIC FLASHER CAUTION SIGNAL SYSTEM FOR AUTOMOTIVE VEHICLES
Filed April 15, 1964     2 Sheets-Sheet 2
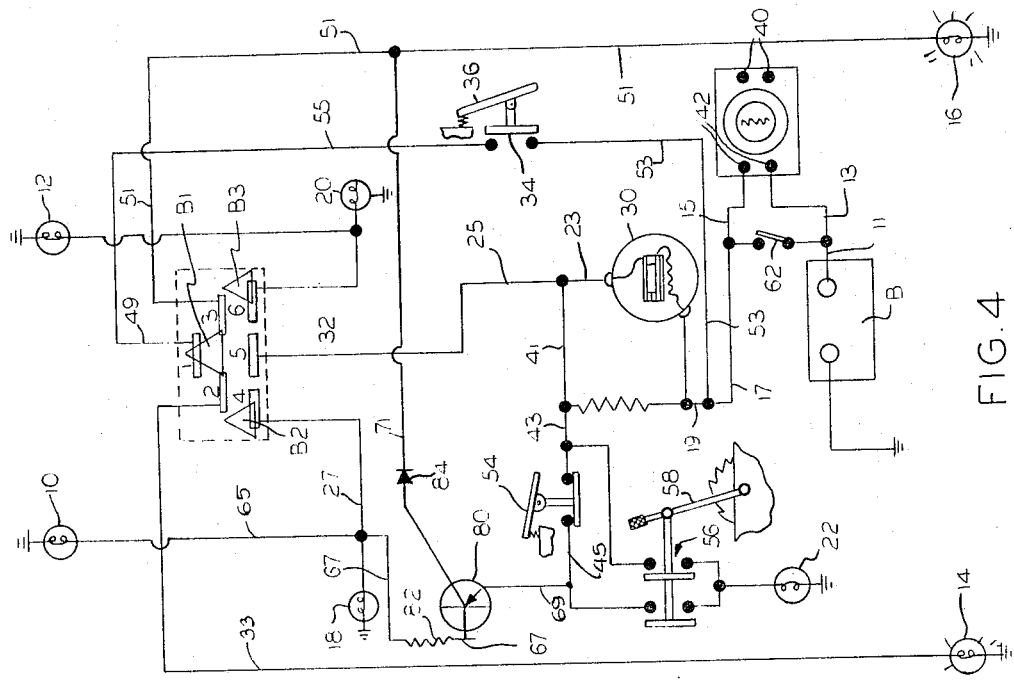
INVENTOR.
CARL G. MILLER
BY
ATTORNEY 3,300,756
AUTOMATIC FLASHER CAUTION SIGNAL SYSTEM FOR AUTOMOTIVE VEHICLES
Carl G. Miller, 6285 N. Leona Ave.,
Chicago, Ill. 60646
Filed Apr. 15, 1964, Ser. No. 359,850
7 Claims. (Cl. 340—72)

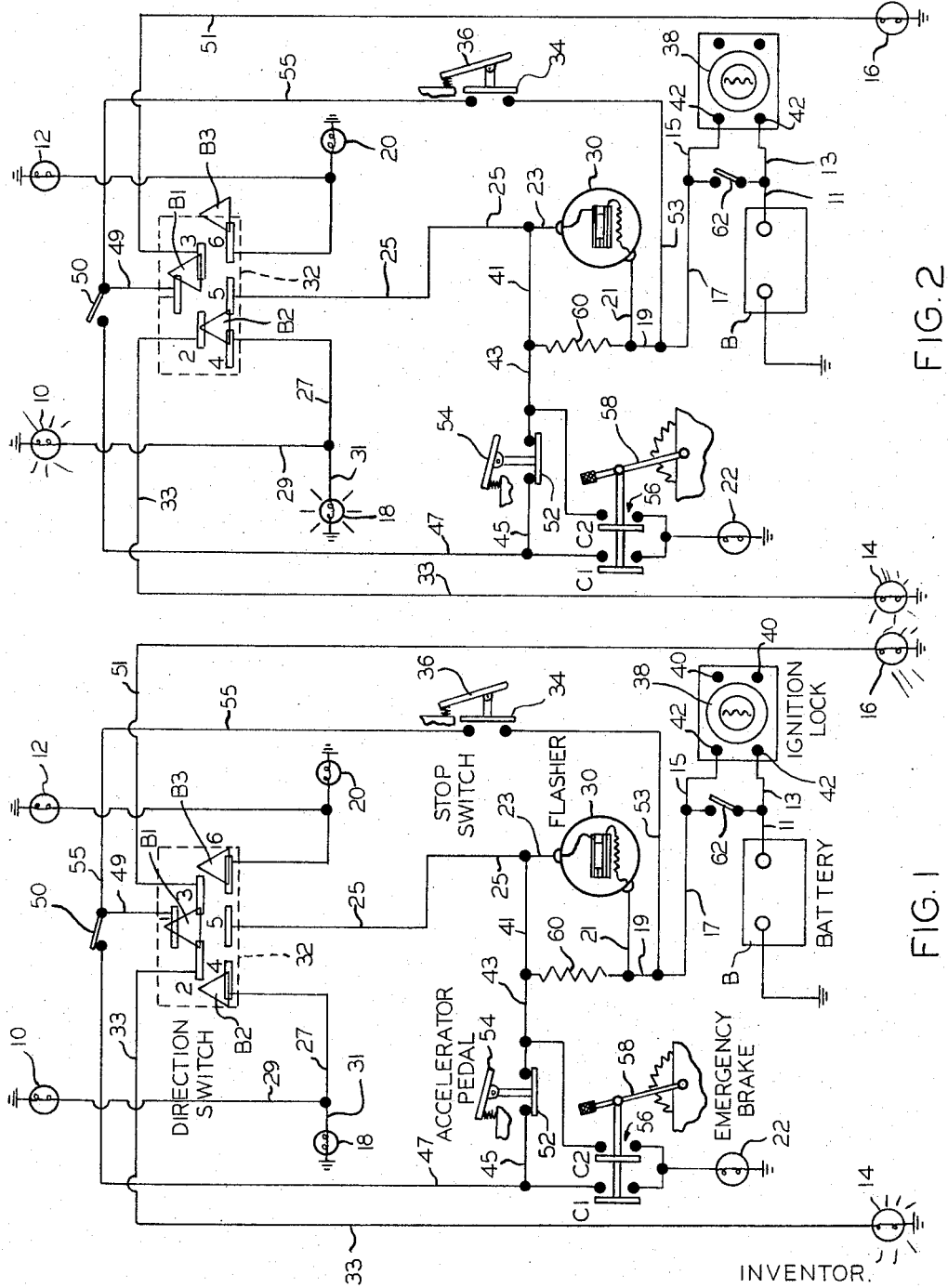

The present invention relates to automative vehicle signal systems and has particular reference to an automatic signal system which, in addition to affording the conventional right and left turn signals and emergency stop signal, affords a caution signal which is visible from the rear of the vehicle to the end that the driver of an ensuing vehicle may be apprised of the fact that the first vehicle is not under power or, in other words, is "coasting," and may therefore be expected reasonably soon to apply his brakes. The caution signal afforded by the signal system of the present invention may therefore be termed a pre-emergency brake signal.

Practically all domestic and foreign automotive vehicles manufactured within the past decade are equipped with a turn signal system which has become fully standardized and which is required by law in many States. This system involves the use of a pair of white lamps, one on each side of the vehicle, visible from the front of the vehicle, and a similar pair of red lamps, similarly positioned, and visible from the rear of the vehicle. An impending right turn is signalled by intermittently flashing both lamps on the right side of the vehicle, while an impending left turn is signalled by flashing both lamps on the left side of the vehicle. The red lamps which are visible from the rear of the vehicle are also employed for rendering an emergency stop signal, in which case either or both of these lamps are illuminated continuously and simultaneously. Whether the signal lamps employed be actually individual lamp units or envelopes separate from the normal night illuminating lamp units or envelopes, or whether they consist of separate lamp filaments enclosed within the same envelope as the illuminating filaments, the essential signal system involved remains substantially the same.

Not only has the signal system briefly outlined above become firmly standardized, but so also have the electrical components and circuitry by means of which the system is rendered effective. Briefly, these components include a flasher and a control switch therefor, the control switch being selectively operable to connect the flasher in a series-parallel relationship with either the signal lamps on the left side of the vehicle or the signal lamps on the right side of the vehicle. There also is provided an emergency stop switch which overrides the flasher but which, for convenience, is connected through the flasher control switch in such a manner that either or both of the two red signal lamps which are visible from the rear of the vehicle will become continuously illuminated when the stop switch is closed. This stop switch invariably is closed by depression of the vehicle brake pedal, while the flasher control switch invariably is manipulated by a lever arm on the steering column of the vehicle.

The present invention in no way disturbs the functioning of the above-described conventional or standardized signal system which remains operable at all times to perform its intended functions automatically and under driver control. It does, however, impose upon such a system an auxiliary signal system by means of which the operator of the vehicle may cause a caution signal to be rendered, such a signal being evidenced by a simultaneous flashing of both red signal lamps to the exclusion of the other signal lamps in the system. This caution signal is rendered automatically during vehicle operation only at such times as the vehicle is not under acceleration as when the pressure upon the accelerator pedal is relaxed. The signal is initiated when the accelerator pedal assumes its fully retracted position, the signal being extinguished as soon as the accelerator is again depressed.

Considering now a vehicle which is moving at a fairly high rate of speed in normal traffic, if a slow-down in traffic becomes apparent an appreciable distance ahead, the normal reaction of an experienced driver will be to release his pressure upon the accelerator pedal so that the vehicle will commence slowing down. If the slow-down in traffic clears up, the driver will again resume normal speed by depressing his accelerator pedal, but if the slow-down continues, the driver will of course apply his brakes appropriately.

The caution signal of the present invention is intended to alert the driver of a following vehicle to the fact that the driver of the vehicle immediately ahead is undergoing such a period of indecision wherein, within the next few moments, the leading driver may either accelerate or apply his brakes. In this manner the driver of the following vehicle, upon observing the caution signal given him by the driver of the leading vehicle, will not approach too closely lest the latter decelerate rapidly or come to a full stop. In an instance such as has been set forth above, the caution signal which is rendered by the leading vehicle is, in effect a pre-emergency brake signal although each time the signal is rendered it does not necessarily imply that an emergency brake or "stop" signal will inevitably follow.

The provision of a signal system which is capable of rendering such a caution signal and which utilizes for its basic components the conventional ignition and signalling circuitry of present day automotive vehicles constitutes the principal object of the present invention.

It is a further object to provide a signal system capable of rendering a caution signal in the manner and for the purpose briefly outlined above, and in which means are provided whereby when normal signals other than the caution signal, i.e. right and left turn signals, or an emergency stop signal, are rendered, these normal signals will override the caution signal if the latter is in effect, or will prevent its initiation if it is not in effect, so that the normal function of the standardized or conventional system is in no way altered and so that unintended erroneous signals are not initiated.

Another object is to provide structure whereby the caution signal may be initiated and allowed to remain in effect when the vehicle is in a standing condition, either with or without a driver or other occupant, thus rendering the caution signal effective to warn oncoming or passing traffic emanating from the rear of the vehicle that the vehicle is either stalled or voluntarily parked. In connection with this latter object, a feature of the invention resides in the fact that although electric current for effecting the caution signal is derived from the ignition switch block, the ignition circuit of the vehicle is not disturbed, and the ignition system may not be energized without insertion of the proper key in the ignition lock.

The provision of a signal system for rendering a caution signal as outlined above, and which is capable of being installed as original equipment on new automotive vehicles with but slight modification, or which, alternatively, is capable of being similarly applied to existing vehicles not originally so equipped, constitutes another feature of the present invention.

The provision of a signal system which requires for its installation no extensive wiring or rewiring of the vehicle; one which, in the main, is automatically operable under the control of standard vehicle control components such as the accelerator pedal, brake pedal and the emergency brake lever, so that no particular skill on the part of the vehicle operator is required for its operation; one which is rugged and durable and which therefore is unlikely to get out of order; one which, in certain of the embodiments which the invention is capable of assuming, requires no specially consrtucted or expensive electrical components; and one which, otherwise, is well adapted to perform the services required of it, are further desirable features which have been borne in mind in the production and development of the present invention.

The invention is susceptible to modification and several forms of the invention are contemplated, three such forms being illustrated in the accompanying drawings. The basic principle of the invention is common to all of these illustrated forms but the forms differ among themselves only in the manner in which the initiation of a turn signal or a stop signal overrides the signalling of a caution signal so that an erroneous signal will not be given as heretofore mentioned. The preferred form for any given vehicle will depend upon the factory wiring of such vehicle.

Numerous other objects and advantages of the invention not at this time enumerated, will readily suggest themselves as the following description ensues.

In the drawings:

FIG. 1 is a circuit diagram of one form of signal system embodying the basic principle of the present invention, and wherein the overriding control for disabling the caution signal is solely a function of the conventional directional control switch associated with the vehicle signal system, the circuit being conditioned to render a caution signal;

FIG. 2 illustrates the circuit diagram of FIG. 1 when it is conditioned for a turn signal, the rendering of a caution signal being prevented at this time;

FIG. 3 is a circuit diagram of another form of the invention wherein the overriding control for disabling the caution signal is relay-actuated; and FIG. 4 is a circuit diagram of a further form of the invention wherein the disabling means for the caution sigal involves the use of solid state impedance devices.

Referring now to the drawings in detail and in particular to FIG. 1, the various electrical and mechanical components and instrumentalities shown in this view are appropriately mounted on an automotive vehicle, and they include a series of signal lamps which, according to standardized practice, mandatory by law in certain States, are capable upon selective energization thereof in a particular manner, of rendering turn and emergency stop signals. These lamps include front left and right turn signal lamps 10 and 12 respectively, which usually are colored white or yellow; rear left and right turn signal lamps 14 and 16 respectively, which usually are colored red; left and right turn dash indicator lamps 18 and 20 respectively, which usually are colored green; and an emergency brake signal lamp 22 usually colored red. The lamps 10 and 12 are visible from the front of the vehicle and usually they are in the form of individual envelope-enclosed filaments which are independent of the vehicle headlights. The lamps 14 and 16 are visible from the rear of the vehicle and they may be either independent envelope-enclosed filaments, or they may be filaments which are enclosed in common with other filaments representing the usual rear illuminating lamps for the vehicle. The lamps 18 and 20 are individual envelope-enclosed filaments, and are usually disposed behind the vehicle instrument panel and are visible to the operator of the vehicle through openings in the panel.

The conventional signal system associated with the various lamps 10, 12, 14, 16, 18 and 20 remains undisturbed and the electrical components associated with this conventional system include a battery B, a thermally responsive flasher 30, a direction switch 32 and a normally open stop light switch 34 adapted to become closed when pressure is applied to the vehicle brake pedal 36. The system further includes an ignition lock switch 38 having ignition terminals 40 and signal control terminals 42 associated therewith. The direction switch 32 is purely conventional and includes the usual six contacts which have been labelled from 1 to 6 inclusive cooperating with a three element bridge arrangement, bridge elements thereof beng labelled B1, B2 and B3 respectively. The direction switch 32 is a three-position switch and, normally, when the bridge elements assume the neutral position, in which they are shown in FIG. 1, the #5 contact which is the input contact of the switch is disconnected from all of the signal lamps so that no signal may be rendered.

When the bridge arrangement of the switch 32 is shifted to render a turn signal, for example, a left turn signal as illustrated in FIG. 2, a flashing circuit will extend to all three of the signal lamps 10, 14 and 18. This circuit extends from the battery B, through leads 11, 13, terminals 42, leads 15, 17, 19, 21, flasher 30, leads 23, 25, bridge element B2 of the switch 32, and from thence through three parallel current paths leading to the lamps 10, 14 and 18 respectively. One of these paths extends from the #4 contact of direction switch 32 through leads 27 and 29 to the lamp 10. Another path extends from the #4 contact through leads 27 and 31 to the lamp 18. The third path extends from the #2 contact through lead 33 to the lamp 14. Since the flasher 30 is common to the three current paths just described, the three lamps 10, 14 and 18 will emit simultaneous flashing signals. When the direction switch 32 is actuated for a right turn signal, contacts 3, 5 and 6 of direction switch 32 become bridged by the bridge element B3 and circuits similar to those described in connection with the rendering of a left turn signal become effective, it being deemed unnecessary to outline such circuits herein.

The circuitry thus far described is purely conventional and no claim is made herein to any novelty associated therewith, the novelty of the present invention residing rather in the superimposing upon such circuitry of additional components which make possible the rendering of a caution signal whereby the two rear signal lamps 14 and 16 will emit a flashing signal to the exclusion of the other signal lamps. These additional components include a signal control switch 50, operated concomitantly with the turn switch 32, a normally closed switch 52 adapted to become open upon depression of the accelerator pedal 54 of the vehicle, and an emergency brake switch 56 having normally open contacts C1 and C2 both adapted to become closed when the emergency brake lever 58 of the vehicle is applied.

According to the present invention, when the direction switch 32 is in the neutral position in which it is shown in FIG. 1, and the accelerator pedal 54 is in its fully released position, the signal lamps 14 and 16 will emit a flashing signal to the exclusion of the signal lamps 10, 12, 18 and 20. The circuit by means of which such a signal (herein termed a caution signal) is effected extends from the battery B, through leads 11, 13, terminals 42 of the ignition switch 38, leads 15, 17, 19, 21, flasher 30, leads 23, 41, 43, switch 52 (now closed), leads 45 and 47, switch 50, lead 49, bridge element B1, and lead 33 to the signal lamp 14. A similar circuit including a parallel branch circuit extending from the bridge element B1, through lead 51 to the signal lamp 16 serves to energize this latter signal lamp. The signal lamps 10, 12, 18 and 20 remain deenergized by reason of the isolation of the bridge elements B2 and B3 and the #4 and #6 contacts of the direction switch 32.

As long as the described condition of accelerator pedal 54 prevails lamps 14 and 16 will continue to flash, and also as long as the turn switch 32 is not operated for either condition. When the direction switch 32 is moved to either turn signal indicating position, for example, the left turn signal indication of FIG. 2, the previously described circuit for effecting a flashing of the signal lamp 14 will be established and, at the same time, flashing of the signal lamp 16 will be discontinued due to isolation of the bridge element B1 and the #3 contact of the direction switch 32, since switch 50 is open for a turn signal in either direction.

The resistor indicated at 60 is disposed in shunt relation with respect to the flasher 30 and is provided for the purpose of bypassing sufficient current around the flasher to prevent its operation in the event that either the signal lamp 14 or the signal lamp 16 become inoperative. In such an instance the other or counterpart signal lamp would emit a steady signal at such time that a caution signal was intended so that a false turn signal would be avoided.

Emergency brake switch 56 is provided for a dual purpose. First, upon application of the emergency brake lever 58 and consequent closure of contacts C1 and C2 of this switch, a bypass is provided around the switch 52, thus permitting the signalling of a caution signal when the vehicle is left unattended. If the engine of the vehicle is cold and the automatic choke associated with the vehicle prevents the accelerator pedal from closing the switch 52, the switch 56 will pass current through the circuit involved in connection with the rendering of a caution signal regardless of the position of the accelerator pedal. In order to supply energizing current for initiating the caution signal when the vehicle is unattended, a manual switch 62 bypasses the terminals 42 of the ignition switch 38. Second, the switch 56 operates when its contacts C1 and C2 are closed to energize the emergency brake signal lamp 22.

Upon depression of the brake pedal 36 and consequent closure of the switch 34, either or both of the signal lamps 14 and 16 will become continuously illuminated depending on the position of the direction switch 32. If this direction switch 32 is in its neutral position, the stop-indicating circuit will exist from the battery B, through leads 11, 13, terminals 42, leads 15, 17 and 53, switch 34 (now closed), and leads 55, 49 to the bridge element B1 of the direction switch 32. Bridge element B1 at this time is connected to contacts 2 and 3 of switch 32 so that the signal lamps 14 and 16 will be continuously energized through the leads 33 and 51 respectively. If the direction switch 32 is in the turn position in which it is shown in FIG. 2, energizing current for the signal lamp 16 will remain effective through the circuit just described, while flasher energizing current for the lamp 14 will be conducted through a branch circuit extending from the lead 25, bridge element B2 of the direction switch 32, and lead 33 to the signal lamp 14. A similar circuit will become effective when the direction switch 32 is positioned for a right turn signal.

In FIG. 3 a slightly modified form of the invention has been shown. In this form of the invention the basic right and left turn signal circuits involving the use of the direction switch 32 and certain other electrical components remains substantially the same as in the form of the invention shown in FIGS. 1 and 2. In order to avoid needless repetition of the description, identical reference numerals have been applied to the corresponding parts as between the disclosures of FIGS. 1 and 3.

In FIG. 3 the signal control switch 50 has been dispensed with and one of the front signal lamps is connected by leads 65, 67 to a relay coil 70 of a normally closed relay switch 72. The contacts 72a thereof are operatively connected by a lead 69 to one side of the pedal-operated switch 52, and by a lead 71 to the lead 51 which extends to the signal lamp 16.

When the direction switch 32 is in its neutral position as shown in FIG. 3, the caution signal involving flashing of both rear signal lamps 14 and 16 will be initiated by a circuit extending from the battery B, through leads 11, 13, terminals 42, leads 15, 17, 19, 21, flasher 30, leads 23, 41, 43, switch 52, leads 45, 69, relay switch 72 (now closed), and leads 71 and 51 to the signal lamp 16. At the same time flashing current will flow from the lead 51 through contacts 3 and 2 of direction switch 32 and the lead 33 to the signal lamp 14.

When the direction switch 32 is operated to render a left turn signal by shifting the bridge element B1 into bridging relation with contacts 1 and 3, by shifting the bridge element B2 into bridging contact with the contacts 2, 4 and 5, and by shifting the B3 bridge element into isolated contact with contact 6, current will then flow from the contact 4 of the switch 32, through leads 27 and 67 to the coil 70 to energize the same. Energization of the coil 70 opens the normally closed contacts 72a of the relay switch 72 and discontinues the flow of flashing current to the signal lamp 16.

When the direction switch 32 is operated to render a right turn signal, the usual flashing signal circuit for the lamp 16 will become effective. Additionally, a parallel path of current extending from the flasher 30, through leads 23, 41, 43, switch 52, leads 45, 69, relay switch 72, and leads 71 and 51 will extend to the signal lamp 16 but this additional flow of flashing current to the signal lamp will be without separate function. Flashing of the signal lamp 14 will be discontinued by reason of isolation of contact 2 of switch 32 in the usual manner of effecting a right turn signal.

The form of the invention shown in FIG. 4 is likewise sufficiently similar to the form of the invention shown in FIG. 3 that the application of identical reference numerals to the corresponding parts as between the two views will serve to avoid needless repetition of description. In FIG. 4 electro-mechanical relay switch 72 has been replaced by what amounts to a solid state relay involving the use of a power transistor 80 and a biasing resistor 82 which is interposed in the lead 67 extending to the signal lamp 10. A one-way gating device such as a diode 84 or a diode connected transistor as shown, has its output side connected through leads 71 and 51 to the signal lamp 16. The input side of the diode 84 is connected to the collector side of transistor 80.

The diode 84 is required to prevent transistor 80 from shorting the flasher 30 when stop switch 34 is closed, and turn signal switch 32 is in the left turn position. The direct battery voltage from lead 53 through stop switch 34, leads 55, 49, bridge element B1, leads 51 and 71, if connected direct to the collector of transistor 80, would cause the transistor to conduct and short the flasher. The caution signal involving the simultaneous flashing of both rear signal lamps 14 and 16 is rendered effective when the direction switch 32 is in its neutral position by means of an electrical circuit similar to that described in connection with the form of the invention shown in FIG. 3 and passing through the relay switch 72, the circuit of FIG. 4 passing through the transistor and diode combination 80, 84 instead of the relay switch.

When the direction switch 32 is positioned to indicate a left turn signal, the resistor 82 will establish a cut-off bias for the transistor 80 and no current will flow through the transistor 82 and diode 84 to the signal lamp 16 so that a false caution signal will be prevented. When the direction switch 32 is positioned to indicate a right turn signal, the transistor and diode will pass current and provide an additional path for the flow of flashing current to the signal lamp 16, the current to the signal lamp 14 being discontinued by isolation of contact 2 of the switch 32 in the usual manner of directional switch operation.

It is to be noted at this point that in the forms of the invention shown in FIGS. 3 and 4, either the relay switch 72 or the transistor-diode combination 80, 84 may be connected to the signal lamp 12 and 14 instead of to the signal lamps 10 and 16 and substantially identical circuit operation for preventing a false caution signal from being rendered when a turn signal is desired will take place. In other respects also, the invention is not to be limited to the exact arrangement of parts shown in the accompanying drawings or described in this specification as various changes in the details of the circuitry involved may be resorted to without departing from the spirit of the invention. Therefore, only insofar as the invention has particularly been pointed out in the accompanying claims is the same to be limited.

I claim:

1. The combination in a motor vehicle having paired signal lamps mounted front and rear thereon, a source of energizing current for said lamps, a flasher including a pair of thermally responsive contacts connected to said source, a three-position direction switch connected to said contacts and to the signal lamps and operable in a first position to connect the flasher contacts to one pair of said signal lamps to the exclusion of the other pair of signal lamps, in a second position to connect the flasher contacts to the other pair of signal lamps to the exclusion of said one pair of signal lamps, and in a third position to disconnect the flasher contacts from both pairs of signal lamps, a depressible accelerator pedal, and an emergency brake lever; of means automatically operable under the control of said accelerator pedal for connecting the flasher contacts to the rear ones only of said signal lamps when the direction switch is in its third position, said means comprising a normally closed switch operable upon depression of the accelerator pedal to become open, said latter switch being normally connected in its closed position to the rear ones only of said signal lamps and to the flasher contacts when the direction switch is in its third position, and relay actuated switch means operable when said direction switch is moved to its first position for maintaining deenergized the rear signal lamp on the side opposite to the lamp pair normally energized when the direction switch is in said first position.

2. The combination set forth in claim 1, wherein said relay-actuated switch means comprises a relay including a pair of normally closed relay contacts connected to the accelerator pedal-operated switch and to said rear signal lamps, and an actuating coil operable upon energization thereof to open said normally closed relay contacts, said coil being operably connected to the said rear ones of said signal lamps for simultaneous enerigzation therewith under the control of said direction switch when the later is in its first position.

3. The combination set forth in claim 1 including a manually operable emergency switch disposed in shunt relationship with respect to said normally closed accelerator pedal-operated switch.

4. The combination set forth in claim 3, wherein said manually operable emergency switch is normally open and is adapted to become closed upon application of the emergency brake lever.

5. The combination in a motor vehicle having a pair of signal lamps mounted thereon, a source of energizing current for said lamps, a flasher including a pair of thermally responsive contacts connected to said source, a three-position direction switch connected to said contacts and to the signal lamps and operable in a first position to connect the flasher contacts to one of said signal lamps to the exclusion of the other signal lamp, in a second position to connect the flasher contacts to the other signal lamp to the exclusion of said one signal lamp, and in a third position to disconnect the flasher contacts from both signal lamps, a depressible accelerator pedal, a depressible brake pedal, and an emergency brake lever; of means automatically operable under the control of said accelerator pedal for connecting the flasher contacts to both of said signal lamps when the direction switch is in its third position, said means comprising a normally closed pedal-operated switch operable upon depression of the accelerator pedal to become open, a transistor and a biasing resistor therefor, a one-way gating device connected between said resistor and said signal lamp, said transistor having its collector connected to said one-way gating device, said transistor having its emitter connected to said accelerator pedal-operated switch, and having its base operatively connected through said biasing resistor to one of said signal lamps.

6. The combination in a motor vehicle having a pair of signal lamps mounted thereon, a source of energizing current for said lamps, a flasher including a pair of thermally responsive contacts connected to said source, a three-position direction switch connected to said contacts and to the signal lamps and operable in a first position to connect the flasher contacts to one of said signal lamps to the exclusion of the other signal lamp, in a second position to connect the flasher contacts to the other signal lamp to the exclusion of said one signal lamp, and in a third position to disconnect the flasher contacts from both signal lamps, a depressible accelerator pedal, a depressible brake pedal, and an emergency brake lever; of means automatically operable under the control of said accelerator pedal for connecting the flasher contacts to both of said signal lamps when the direction switch is in its third position, said means comprising an electronic valve connecting said accelerator pedal-operated switch to both of said signal lamps when the direction switch is in its third position, and cut-off biasing means operable when the direction switch is in its first position to render said electronic valve ineffective.

7. The combination in a motor vehicle having a pair of signal lamps mounted thereon, a source of energizing current for said lamps, a flasher including a pair of thermally responsive contacts connected to said sources, a three-position direction switch connected to said contacts and to the signal lamps and operable in a first position to connect the flasher contacts to one of said signal lamps to the exclusion of the other signal lamp, in a second position to connect the flasher contacts to the other signal lamp to the exclusion of said one signal lamp, and in a third position to disconnect the flasher contacts from both signal lamps, a depressible accelerator pedal, and an emergency brake lever; of means automatically operable under the control of said accelerator pedal for connecting the flasher contacts to both of said signal lamps when the direction switch is in its third position, said means comprising a normally closed switch operable upon depression of the accelerator pedal to become open, said latter switch being normally connected to both of said signal lamps and to the flasher contacts when the direction switch is in its third position, and switch means connected in shunt with said means automatically operable by said accelerator pedal and closed by operation of said emergency brake lever to continue the operation of said signal lamps irrespective of the condition of said accelerator pedal.

References Cited by the Examiner
UNITED STATES PATENTS

| | | | |
|---|---|---|---|
| 2,810,899 | 10/1957 | Foster | 340—72 |
| 2,957,161 | 10/1960 | Daws | 340—71 X |

NEIL C. READ, *Primary Examiner.*

A. H. WARING, *Assistant Examiner.*